US007370272B2

(12) United States Patent
Brodersen et al.

(10) Patent No.: US 7,370,272 B2
(45) Date of Patent: May 6, 2008

(54) DATA ADAPTER

(75) Inventors: Robert Brodersen, Redwood City, CA (US); Mark Coyle, San Francisco, CA (US); Sanjin Tulac, Mountain View, CA (US)

(73) Assignee: Siebel Systems, Inc., San Mateo, CA (US)

( * ) Notice: Subject to any disclaimer, the term of this patent is extended or adjusted under 35 U.S.C. 154(b) by 774 days.

(21) Appl. No.: 09/846,920

(22) Filed: Apr. 30, 2001

(65) Prior Publication Data

US 2007/0192348 A1 Aug. 16, 2007

Related U.S. Application Data

(60) Provisional application No. 60/283,713, filed on Apr. 14, 2001.

(51) Int. Cl.
*G06F 3/048* (2006.01)
(52) U.S. Cl. .............. 715/514; 715/530; 715/500.1
(58) Field of Classification Search .......... 715/500, 715/500.1, 514, 516, 530
See application file for complete search history.

(56) References Cited

U.S. PATENT DOCUMENTS

| 5,432,925 A | | 7/1995 | Abraham et al. ......... 395/500 |
| 5,497,491 A | | 3/1996 | Mitchell et al. .......... 395/700 |
| 5,499,371 A | | 3/1996 | Henninger et al. ....... 395/700 |
| 5,542,078 A | | 7/1996 | Martel et al. ............ 395/600 |
| 5,809,507 A | | 9/1998 | Cavanaugh, III ......... 703/103 |
| 5,887,171 A | * | 3/1999 | Tada et al. .............. 719/317 |
| 5,958,004 A | | 9/1999 | Helland et al. ........... 709/101 |
| 6,078,926 A | * | 6/2000 | Jensen et al. ........... 707/103 R |
| 6,125,383 A | | 9/2000 | Glynias et al. .......... 709/202 |
| 6,163,781 A | * | 12/2000 | Wess, Jr. ............... 707/103 X |

(Continued)

FOREIGN PATENT DOCUMENTS

EP 1030254 A1 8/2000

(Continued)

OTHER PUBLICATIONS

Elmasari et al., Fundamentals of Database Systems, 1994, Benjamin/Cummings Publishing Company, Inc., Second Edition, p. 25.*

(Continued)

*Primary Examiner*—Stephen Hong
*Assistant Examiner*—Gregory J. Vaughn
(74) *Attorney, Agent, or Firm*—Campbell Stephenson LLP

(57) ABSTRACT

A data adapter including method and apparatus is presented. In one embodiment, the data adapter is a method. The method includes finding a set of records of a relational database matching an object instance of an object type. The method further includes updating the set of records of the relational database based on a first set of instances of components of the object instance, the instances of components of the first set corresponding to the records of the set of records. The method further includes inserting new records in the relational database corresponding to a second set of instances of components of the object instance, the instances of components of the second set not matching records of the set of records. The method also includes recursively repeating the finding, updating and inserting with respect to child components of the components.

19 Claims, 12 Drawing Sheets

U.S. PATENT DOCUMENTS

| | | | |
|---|---|---|---|
| 6,253,367 B1 | 9/2001 | Tran et al. | 717/2 |
| 6,449,627 B1* | 9/2002 | Baer et al. | 715/514 |
| 6,453,356 B1 | 9/2002 | Sheard et al. | 709/231 |
| 6,499,026 B1* | 12/2002 | Rivette et al. | 707/2 |
| 6,560,592 B1* | 5/2003 | Reid et al. | 707/2 |
| 6,574,635 B2 | 6/2003 | Stauber et al. | 707/103 |
| 6,578,056 B1* | 6/2003 | Lamburt | 715/500.1 |
| 6,591,272 B1* | 7/2003 | Williams | 707/102 |
| 6,601,057 B1* | 7/2003 | Underwood et al. | 707/1 |
| 6,601,072 B1 | 7/2003 | Gerken, III | 707/103 R |
| 6,633,889 B2 | 10/2003 | Dessloch et al. | 707/103 Y |
| 6,636,242 B2* | 10/2003 | Bowman-Amuah | 345/764 |
| 6,654,801 B2 | 11/2003 | Mann et al. | 709/224 |
| 6,668,254 B2 | 12/2003 | Matson et al. | 707/10 |
| 6,697,825 B1* | 2/2004 | Underwood et al. | 715/530 |
| 6,704,804 B1* | 3/2004 | Wilson et al. | 719/315 |
| 6,708,164 B1* | 3/2004 | Cseri et al. | 707/4 |
| 6,768,986 B2* | 7/2004 | Cras et al. | 707/2 |
| 6,769,124 B1* | 7/2004 | Schoening et al. | 719/316 |
| 7,257,820 B2 | 8/2007 | Fischer et al. | 719/316 |
| 2001/0051949 A1* | 12/2001 | Carey et al. | 707/103 R |
| 2002/0049788 A1* | 4/2002 | Lipkin et al. | 707/513 |
| 2002/0059299 A1* | 5/2002 | Spaey | 707/104.1 |
| 2002/0138353 A1* | 9/2002 | Schreiber et al. | 705/26 |
| 2002/0157020 A1 | 10/2002 | Royer | 713/201 |
| 2003/0023580 A1* | 1/2003 | Braud et al. | 707/3 |

FOREIGN PATENT DOCUMENTS

EP    1122652 A1    8/2001

OTHER PUBLICATIONS

V.Y. Lum et al.; "A General Methodology for Data Conversion and Restructing;" IBM Journal of Research and Development; International Business Machines Corp.; New York, NY; V. 20; No. 5; (Sep. 1, 1976); pp. 483-497.

Sybase; "POwerDesigner® WarehouseArchitect™ The Model for Data Warehousing Solutions;" Sybase Technical Paper; (Mar. 29, 1999); pp. 2-19.

James Hoffman, "Introduction to Structured Query Language, " 1997, available via the Internet at http://www.geocities.com/Silicon Valley/Vista/2207/sql1.htm/?200627, pp. 1-25.

\* cited by examiner

| INPUT | EXISTING RDBMS | RESULT |
|---|---|---|
| X | X | UPDATE |
| X | - | INSERT |
| - | X | DELETE/ NO-OP |

FIG. 6

DATA ADAPTER

This application claims priority to provisional application No. 60/283,713, filed Apr. 14, 2001, entitled "Data Adapter", by Robert Broderson, Mark Coyle and Sanjin Tulac, having 135 pages (including exhibits), which is hereby incorporated by reference including incorporation of exhibits therein and which is attached hereto as Exhibit 1. This application is related to U.S. patent application Ser. No. 09/968,735, entitled "Method and System for Using Integration Objects with Enterprise Business Applications", filed Sep. 28, 2001 by Jeffrey Michael Fischer and Mark Coyle.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The invention primarily relates to the field of data processing and more particularly to transforming and updating data represented in a relational database based on data represented in a hierarchical form.

2. Description of the Related Art

While it is well-known to represent data in the form of a relational database, maintaining data in such a database can be a challenge. Outside sources of data can provide new or updated information, but this can be of limited utility when the only option for updating a database is to have a person manually view the outside data source and then update the database. As such, a method for adapting data for update or insertion in a database may be useful.

SUMMARY OF THE INVENTION

A data adapter including method and apparatus is presented. In one embodiment, the data adapter is a method. The method includes finding a set of records of a relational database matching an object instance of an object type. The method further includes updating the set of records of the relational database based on a first set of instances of components of the object instance, the instances of components of the first set corresponding to the records of the set of records. The method further includes inserting new records in the relational database corresponding to a second set of instances of components of the object instance, the instances of components of the second set not matching records of the set of records. The method also includes recursively repeating the finding, updating and inserting with respect to child components of the components.

BRIEF DESCRIPTION OF THE DRAWINGS

The present invention is illustrated by way of example and not limitation in the accompanying figures.

FIG. 6 illustrates an embodiment of a set of actions associated with a set of conditions.

DETAILED DESCRIPTION

A data adapter is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

A data adapter may be used to translate data between a relational database and a hierarchical data structure. Furthermore, the data adapter may be used to update or synchronize the relational database and the hierarchical data structure, thus allowing for coordination of data sources which may have radically different internal structures.

Figure 1:
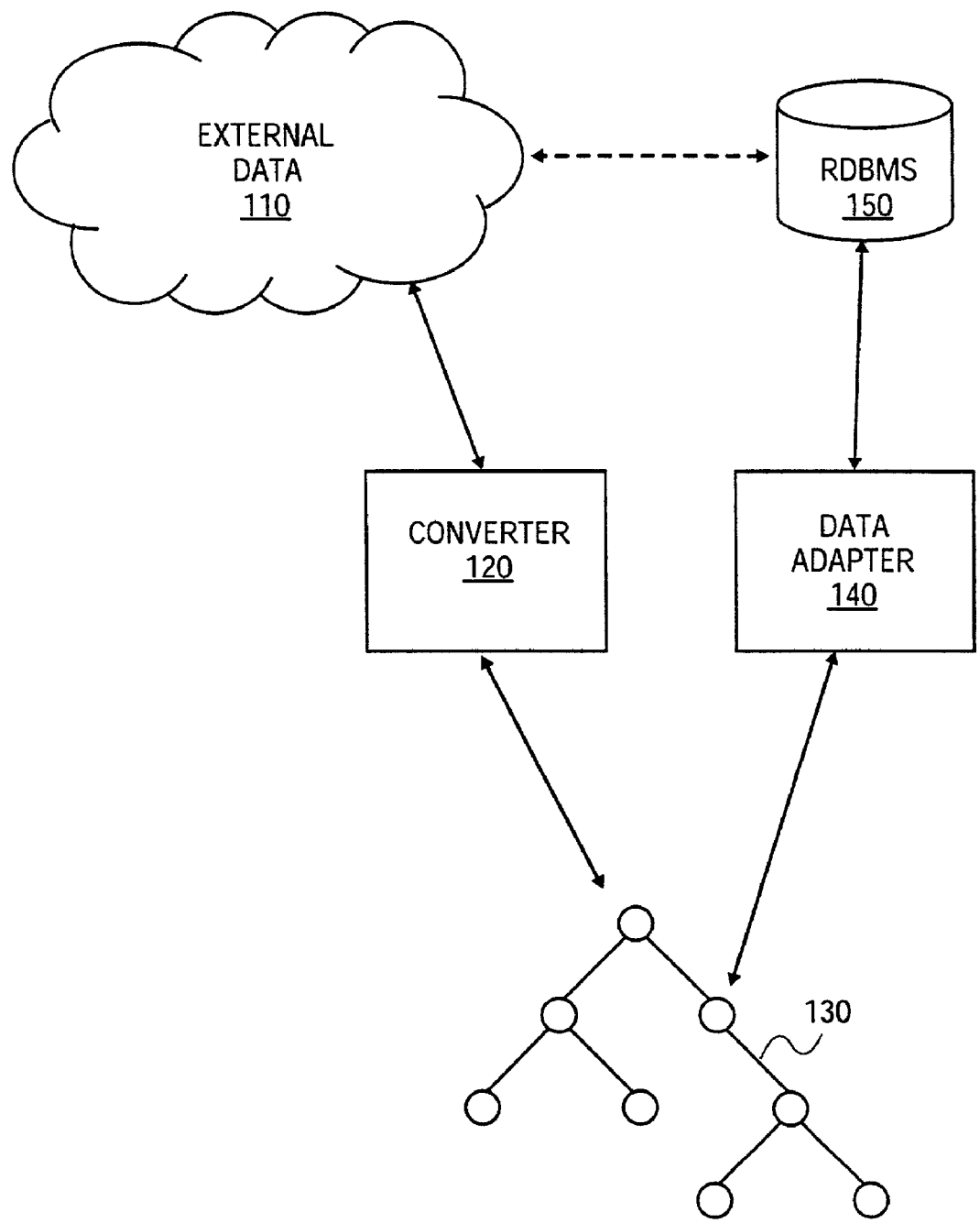
FIG. 1 illustrates an embodiment of a potential dataflow allowing for upsert or synchonization of a relational database from an outside source.

FIG. 1 illustrates an embodiment of a potential dataflow allowing for update of a relational database from an outside source. External data 110 may be a data source such as another relational database, an XML document, a stored user file such as a spreadsheet or word processing document, or other data. Converter 120 represents a converter which may be utilized to transform the data of external data 110 into data represented as integration objects, such as integration objects 130. Integration objects 130 are a set of objects having a hierarchical interrelationship, with each object embodying data and/or methods of accessing data of the object or of accessing related objects. Data adapter 140 represents a converter suitable for upserting or synchronizing data from an integration object into a database or transforming database entries (records) into integration objects. RDBMS 150 represents a relational database system, which stores a variety of data in records having various relationships.

Note that the converter 120 may be implemented in a variety of ways, some of which are discussed in U.S. patent application Ser. No. 09/968,735. entitled "Method and System for Using Integration Objects with Enterprise Business Applications", filed Sep. 28, 2001 by Jeffrey Michael Fischer and Mark Coyle, which is subject to assignment to the same assignee to which this application is subject to assignment. For purposes of this discussion, it is assumed that the integration objects may be created in a straightforward manner, and may be useful as a representation of data stored in a relational database. Furthermore, note that the terms upsert and synchronize appear frequently. Upserting is a combination of updating existing data or inserting new data in a data destination, without deleting data from the data destination which may not exist in the data source. Synchronization is a combination of taking data from a data source, updating existing data or inserting new data relative to data in a data destination, and deleting data from the data destination which is not present in the data source.

In one embodiment, the integration objects 130 are formed as a tree of objects, each having pointers to related objects and embodying both data and methods of accessing the data and related objects. In such an embodiment, an object may be referred to as a root object, indicating that it does not depend on any other object. Such an object typically represents an entry associated with a key or record which is viewed as an original or top-level record. Other objects may be referred to as children of a root, and such child objects will be pointed to by either a root object or by another child object. Typically, a parent of a child object is an object which has a pointer to the child object. Thus, a root object may be expected to be a parent to one or more child objects, and a child object may also be a parent to one or more child objects. With respect to correlations between a root object or child object and database structure, such correlations may or may not be straightforward. Given the relations within a relational database, a first record may be chosen as corresponding to a root object, resulting in a second record appearing to be a child object, while an alternate choice of the second record as the root object may result in the first record appearing to be a child object.

Figure 2A:
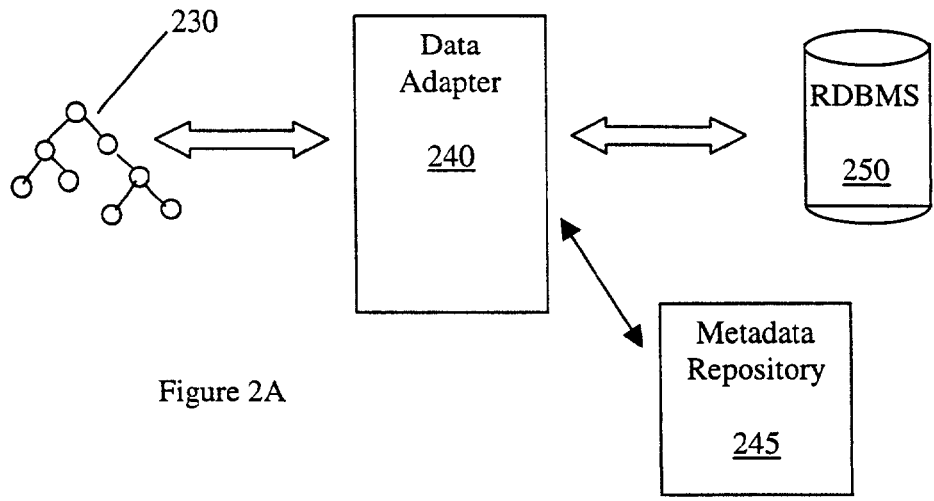
FIG. 2A illustrates an embodiment of data flow from a hierarchical structure to a relational database structure.

FIG. 2A illustrates an embodiment of data flow from a hierarchical structure to a relational database structure. Integration objects 230 are acceptable as an input to data adapter 240, which then upserts or synchronizes the data from the integration objects 230 into the database 250. Alternately, data from the database 250 is used as an input to the data adapter 240, which then produces integration objects 230 as a representation of the data from database 250. Note that the data from database 250 may be a subset of the entire contents of database 250, such as a set of entries selected by a user or requested by a controlling or requesting program for example. Furthermore, the structure of the integration object 230 is defined in metadata available from the metadata repository 245. This metadata may be used by the data adapter to determine not only the structure of the integration object 230, but also how the data embodied in the integration object 230 maps to data in the relational database 250.

Figure 2B:
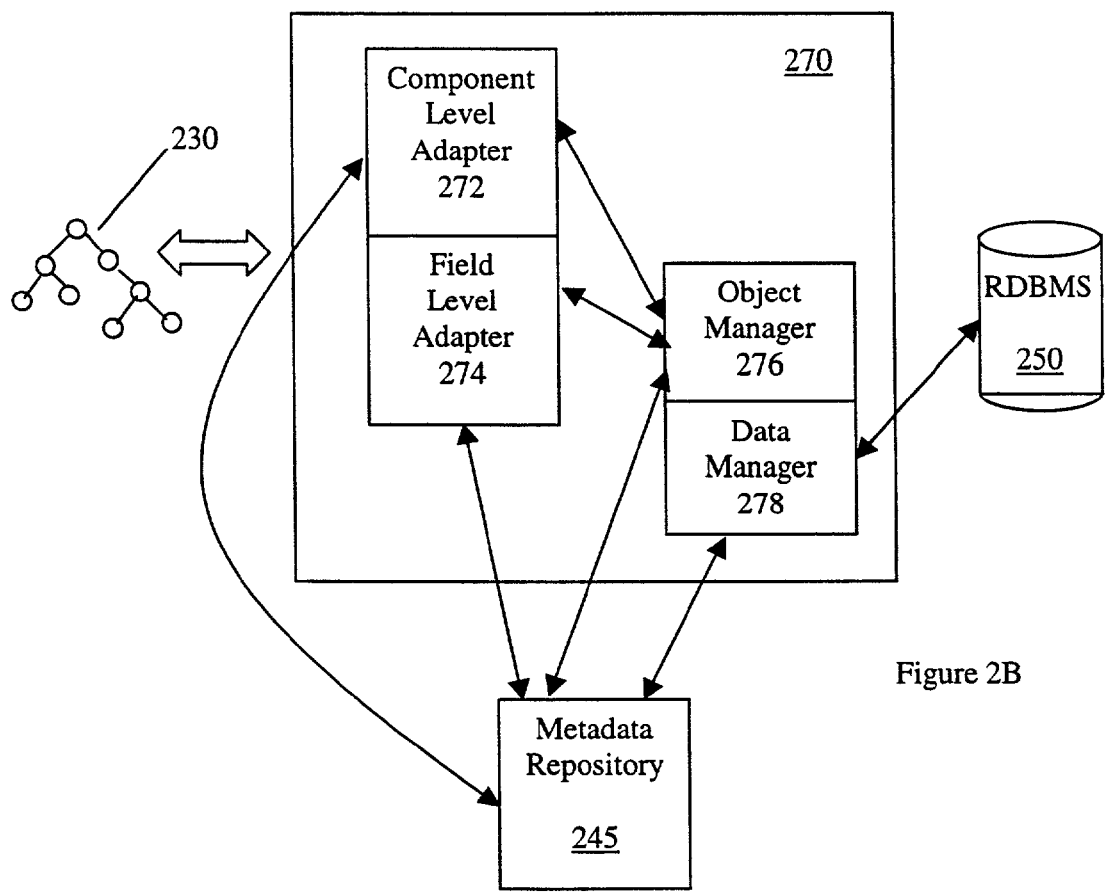
FIG. 2B illustrates an alternate embodiment of data flow from a hierarchical structure to a relational database structure.

FIG. 2B illustrates an alternate embodiment of data flow from a hierarchical structure to a relational database structure. Data adapter 270 is illustrated as including a component level adapter 272, field level adapter 274, object manager 276 and data manager 278. In general, object managers and data managers are relatively well-known types of software modules which may be used to access objects or data in a relational database, and which generate SQL (Sequel) queries for use with the relational database. In one embodiment, the component level adapter 272 and field level adapter 274 each are used to process data at various levels of the hierarchical representation of the integration objects 230 or the relational representation of the database 250. The component level adapter 272 may, in one embodiment, process components or objects, while the field level adapter 274 may process individual fields or portions of components or objects.

The metadata repository 245 may be made available to any or all portions of the data adapter 270. The metadata corresponding to the integration object 230 contained in the metadata repository 245 provides an indication of the structure of the integration object 230 and an indication of the relationship between the structure of the integration object 230 and the relationships among data and tables in the relational database. Thus, the data manager 278 and object manager 276 may utilize the metadata to determine how queries should be structured and how resulting data should be parsed. Similarly, the component 272 and field level adapters 274 may utilize the metadata to determine which fields or components to access, both where data should come from and where data should go. Alternatively, the metadata may be viewed as controlling the various portions of the data adapter 270 by determining how the data flows between the integration object 230 and the relational database 250.

Inherent in the ability to process data is some understanding of the representation of that data prior to processing. For the data adapter to utilize data in integration objects or represent data as integration objects, a format for such integration objects must be provided, and it will be appreciated that this format may be varied according to a variety of design choices. In some embodiments, this format is defined in metadata held in a repository and available to portions of the data adapter.

Figure 3A:
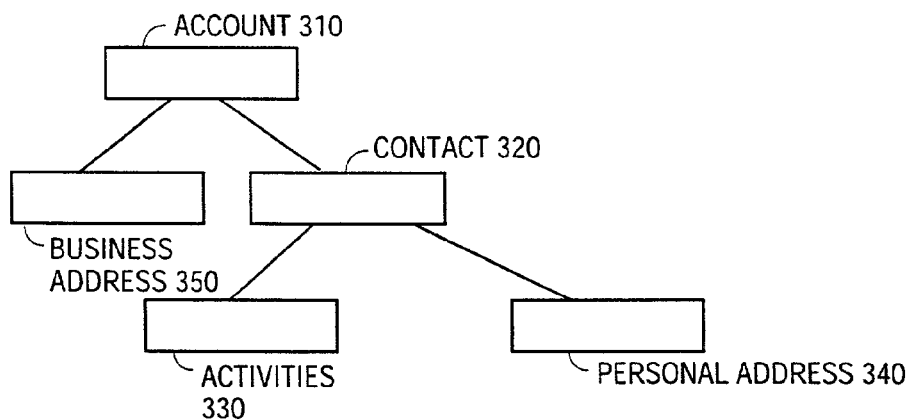
FIG. 3A illustrates an embodiment of a definition of an integration object.

FIG. 3A illustrates an embodiment of a definition of an integration object. Within the integration object are components and fields, of which fields are not illustrated in FIG. 3A. An account 310 may have zero or more contacts 320 and zero or more business addresses 350. Each contact 320 may have zero or more activities 330 and zero or more personal addresses 340. As will be appreciated, definitions for integration objects may be flexible, allowing for various formats and hierarchical relationships. In this illustration, contact 320 is a child of account 310, which is its parent. Moreover, contact 320 is parent to each of children activities 330 and personal address 340. It will be appreciated that each of the children in FIG. 3A will be provided as components associated with the parent of the child in question. Moreover, it will be appreciated that hierarchical data formats cover a broad spectrum, each of which may be utilized in a fairly straightforward manner to store data and allow for retrieval of stored data. Within the integration object, each component has associated with it a userkey as will be described in more detail below.

Figure 3B:
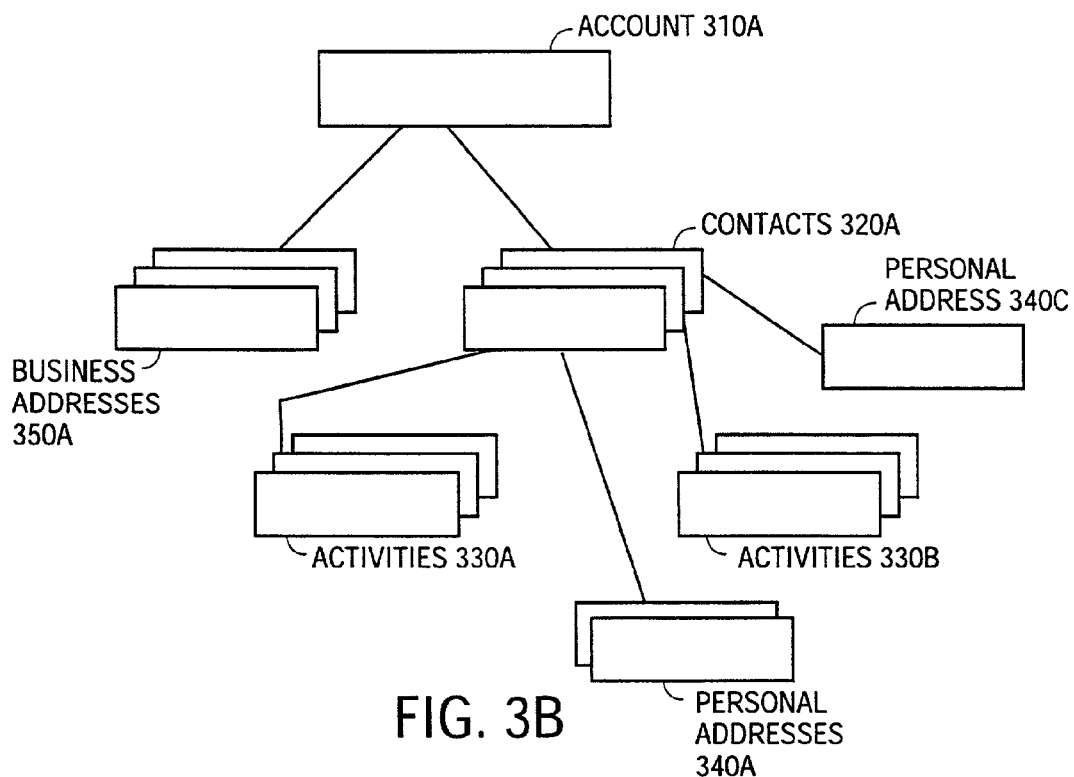
FIG. 3B illustrates an embodiment of an instance of an integration object according to the definition of FIG. 3A.

FIG. 3B illustrates an embodiment of an instance of an integration object according to the definition of FIG. 3A. An instance of an integration object may be viewed as an object which has a structure conforming to the definition of the integration object. Account 310A has a series of three children, each of which is a contact 320A and two other children, each of which is a business address 350A. The first contact 320A has a series of three children, each of which is an activity 330A and another series of two children, each of which is a personal address 340A. Similarly, the second contact 320A has a series of three children, each of which is an activity 330B. Moreover, the third contact 320A has a single child, which is a personal address 340C. While each contact 320A has an identical structure to other contacts 320A, the data embodied therein may be unique or otherwise distinct. Similarly, the activities 330A and 330B may be expected to have a common structure, but embody varying data. Note that in the exemplary illustration associated userkeys are not shown.

Figure 4A:
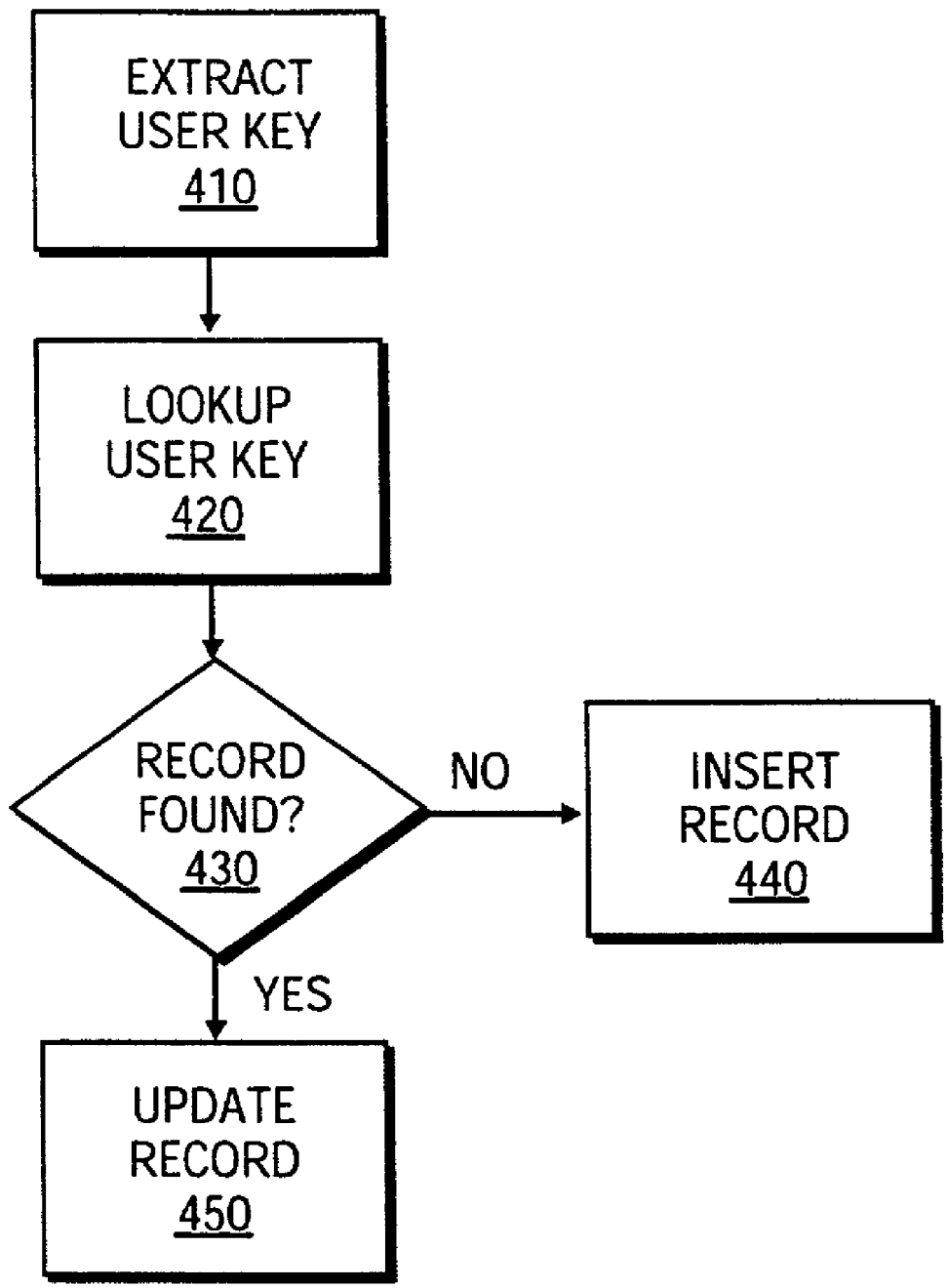
FIG. 4A provides a flow diagram of an embodiment of a method of upserting or synchronizing an object.

FIG. 4A provides a flow diagram of an embodiment of a method of upserting or synchronizing an object. At block 410, a userkey is extracted from the object, as described further below. At block 420, the userkey is looked up or found in the database, providing for one of two proper responses, namely that a record corresponds to the userkey (and thus may need to be modified) or that no corresponding record exists. Thus, the userkey allows for access to data (record(s)) which already exist in the database and correspond to the object in question. At block 430, a determination is made as to whether the corresponding record was found. If not, at block 440, a new record is inserted, having a userkey as extracted and having any other data which is embodied in the object in question. Note that this may involve creating or updating related entries for children of the object in a manner similar to that described with respect to FIG. 5. If a corresponding record is found, at block 450, the record is updated to reflect the data in the object, and examination of children of the object may result in additional updates to related records or entries in the database, again in a manner similar to that described with respect to FIG. 5. This process of either inserting a new record or updating an existing record may be referred to as an upsert process or operation.

Figure 4B:
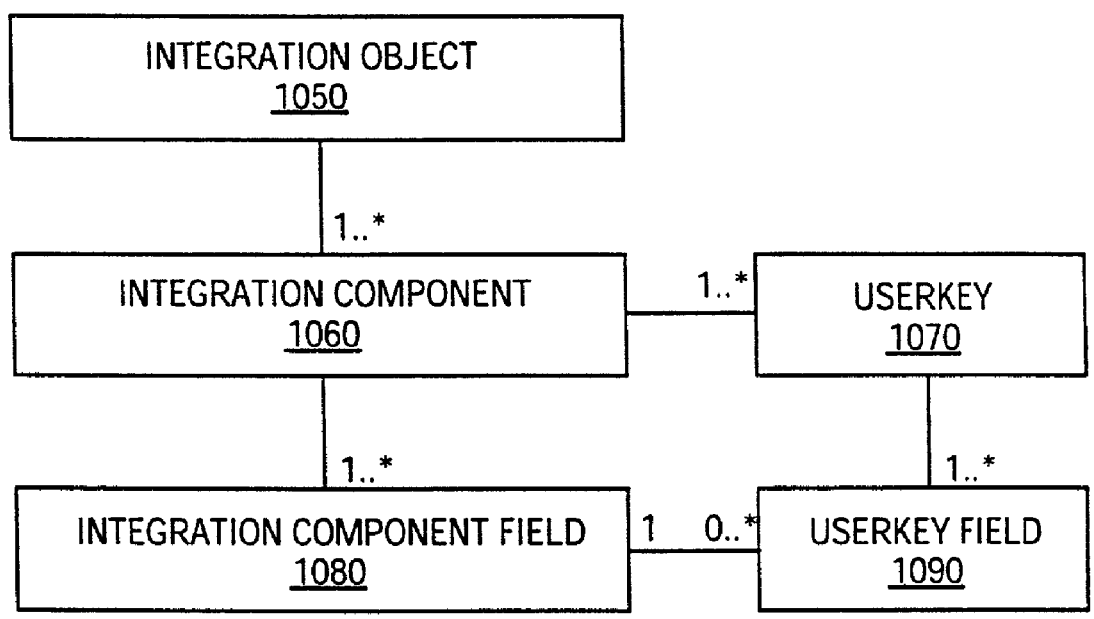
FIG. 4B illustrates an embodiment of an integration component and corresponding userkeys.

FIG. 4B illustrates an embodiment of an integration object definition and related userkey definitions. Integration object 1050 includes a set of integration components 1060 (components). Each integration component 1060 includes a set of integration component fields 1080 (fields). Associated with each integration component 1060 is a set of one or more userkeys 1070, the structure of which may be derived from the components. Associated with each integration component field 1080 is a set of userkey fields 1090, the structure of which may be derived from the integration component fields 1080. Each userkey 1070 may be made up of one or more userkey fields 1090.

Figure 4C:
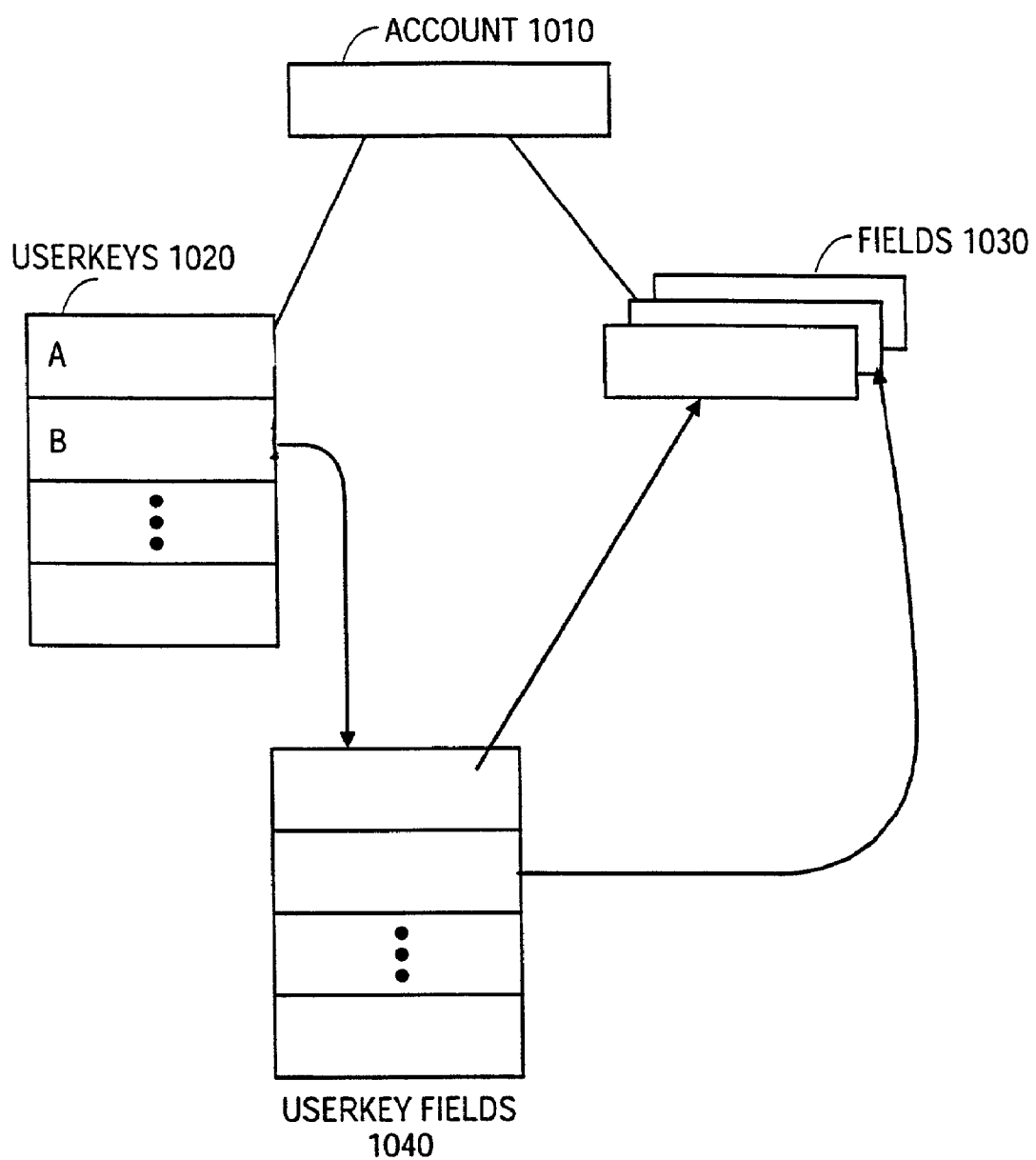
FIG. 4C illustrates an embodiment of an integration object and related userkeys.

With respect to FIG. 4C, an embodiment of an integration component definition and corresponding userkeys is illustrated. Account 1010 is the root component of an object. This Account component contains a set of fields 1030, and a set of userkeys 1020. Each userkey 1020 consists of a set of userkey fields 1040, and each userkey field is associated directly with a single field 1030. The first userkey 1020 labeled "A" consists of a single field labeled 'Integration Id', and association is provided by a single userkey field 1040. The second userkey 1020 labeled "B" is associated with userkey fields 1040, which point to fields 1030 labeled "Name" and "Location" (labels not shown). As will be appreciated, userkey fields 1040 allow for assembly of userkeys in various combinations in conjunction with fields 1030 and potential combinations thereof.

Userkey definitions are an integral part of an integration component definition, which is in turn an integral part of an integration object definition. Which userkey is applicable to a particular integration component is implied by the structure of the data embodied in that component, as defined by the userkey extraction algorithm described later.

The userkeys associated with an integration object may each be used for purposes of matching data within the database to the integration component instances. As long as a userkey can be used to form a query which may be submitted to the database and return a related record from the database, the userkey is potentially useful for purposes of upserting or synchronizing data. However, some userkeys which are combinations of some fields will not be useful in forming a query, because that data does not exist in the database. Thus, there is a need for an opportunity to use multiple userkeys to find the data in question. A single userkey for an integration component may be defaulted to including a few specified fields based on design of the object, and the user of the system may change this design based on performance. However, rather than require the user to constantly intervene when a single userkey is not producing the desired results (access to data), multiple userkeys are used.

The queries thus formed may take advantage of both inner and outer joins allowed in SQL queries. Fields in the object may correspond to fields in the tables of a relational database in various ways. Thus, a userkey for a component in the object may include fields that map to a key related to a first table and a key related to a second table (for another part of the field in the object). It may be expected that a given component or integration object maps to a first table, but that it also maps to a variety of other tables due to the differences in structure between the database and the integration object. The key related to the second table or any other table is a foreign key relative to the first table, and thus inner and outer joins may be used to resolve the foreign keys and allow access to the corresponding data in the database.

Figure 4D:
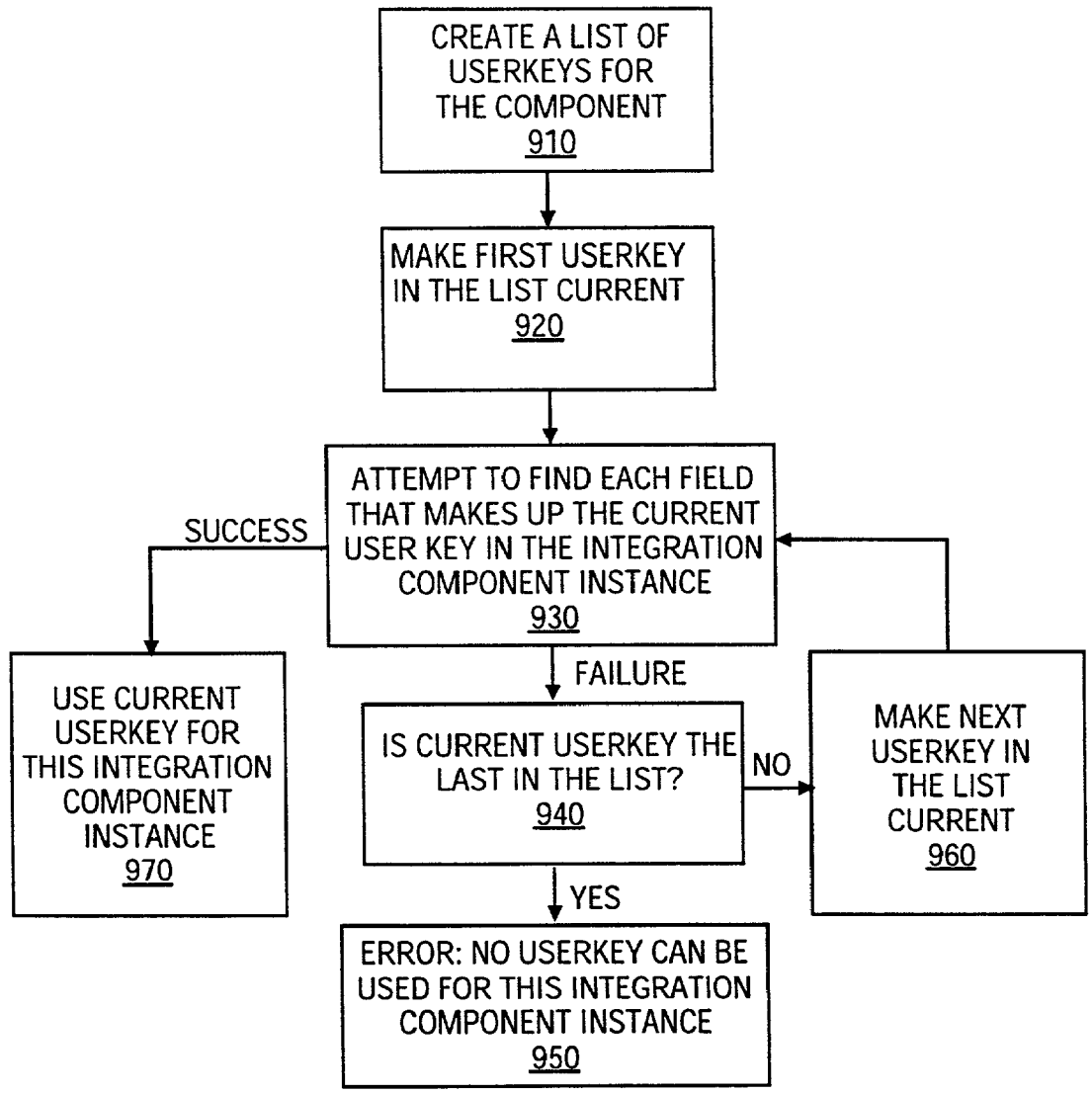
FIG. 4D illustrates an embodiment of a process of extracting a userkey for use with an integration component.

FIG. 4D illustrates an embodiment of a process of extracting a userkey for use with an integration component. At block 910, a list of userkeys is created for the component of the integration object, which is subject to search in the database, and the list is based on the definition of the integration object. As a performance optimization, this list can be cached in memory, and thus block 910 needs to be performed only once per integration component definition. At block 920, the first userkey in the list of userkeys is made the current userkey. At block 930, an attempt to find each field of the userkey in the integration component instance is made, thus validating that the userkey relates directly to this instance of the integration object. If the search succeeds, the userkey is used in conjunction with the corresponding values of the fields in question at block 970. If the search at block 930 fails, a check is made at block 940 as to whether this was the last userkey in the list. If not, the next userkey in the list is made the current userkey at block 960, and the search of block 930 is repeated. Finally, if this is the last userkey in the list, at block 950 an error is generated indicating that a valid userkey cannot be found, and that the integration object can not be upserted or synchronized with the database.

Figure 5:
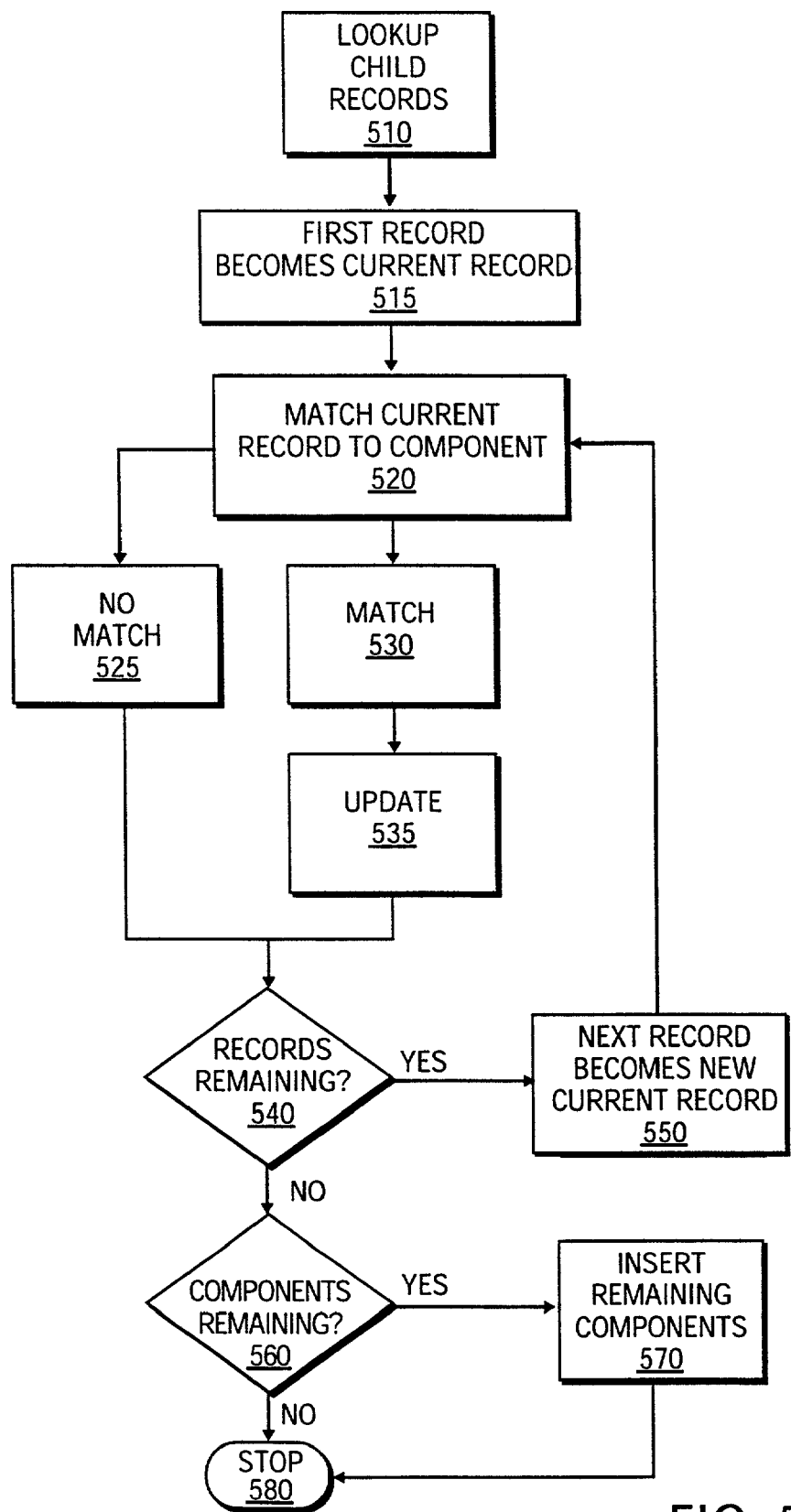
FIG. 5 provides a flow diagram of an embodiment of a method of upserting or synchronizing children associated with an object.

FIG. 5 provides a flow diagram of an embodiment of a method of upserting or synchronizing children associated with an object. At block 510, child records associated with an entry or record are looked up in a database, resulting in a set or list of child records. At block 515, the first child record of the list of child records is made the current child record. At block 520, the current child record is matched to a corresponding component in the hierarchy of components. Note that this matching may be done based on a definition of such a hierarchy and matching with a corresponding component as defined, or may be done in a different manner, such as searching through a hierarchy for a matching component. At block 525, if no match is found, the child record is left undisturbed, or is deleted, depending on whether the type of update is intended to be destructive (synchronize) or merely additive (upsert). In the case of a deletion, this may result in some sort of cascaded delete if appropriate, as the child record in question may have data dependencies within the relational database which must be either preserved or deleted as a whole. At block 530, if a match is found, that match is detected, and at block 535, the child record is updated to reflect the data in the corresponding component.

At block 540, a determination is made as to whether unprocessed child records remain. If such unprocessed child records remain, the next unprocessed child record is then regarded as the current child record (550), and the process returns to block 520. If no unprocessed child records remain, unmatched components in the object or hierarchy of objects are found. If such unmatched components remain (560), those components are inserted (570) into the database as child records corresponding to the components in question and having data from the components in question. If no unmatched components remain, or all unmatched components have been inserted, the process ends at block 580.

Note that in some embodiments, the processing of child records or components will typically have a recursive nature, due in part to the hierarchical structure of the object. Thus, children at one level may be processed one-by-one, with children of children processed before the next child at a given level is processed (thus traversing the tree while processing). Alternatively, the children at the next level may be processed after all children at the current level are processed (in a breadth first manner, for example).

In one embodiment, child records are grouped according to the type of the child record, and each child record of a first type is processed before any child record of a second type is processed. However, such processing need not affect whether the processing of a given child record has a recursive nature, such that the processing of child records of a first child occurs before processing of a second child record (and corresponding child records of the second child record).

FIG. 6 illustrates an embodiment of a set of actions associated with a set of conditions. In the table, X represents presence in a data representation, a dash represents absence. As will be apparent, if a component or field or other item of data is present in both the input objects and the existing RDBMS (database), the data in the database is updated to reflect the data in the object. If the data exists only in the object representation form, the data is inserted in the database. If the data exists only in the database, one of two things occurs. One, the data may be deleted if the process is to conform the database to the objects (synchronize). Two, the data may be left undisturbed if the process is only to update data to reflect any data actually present in the object (upsert).

Figure 7A:
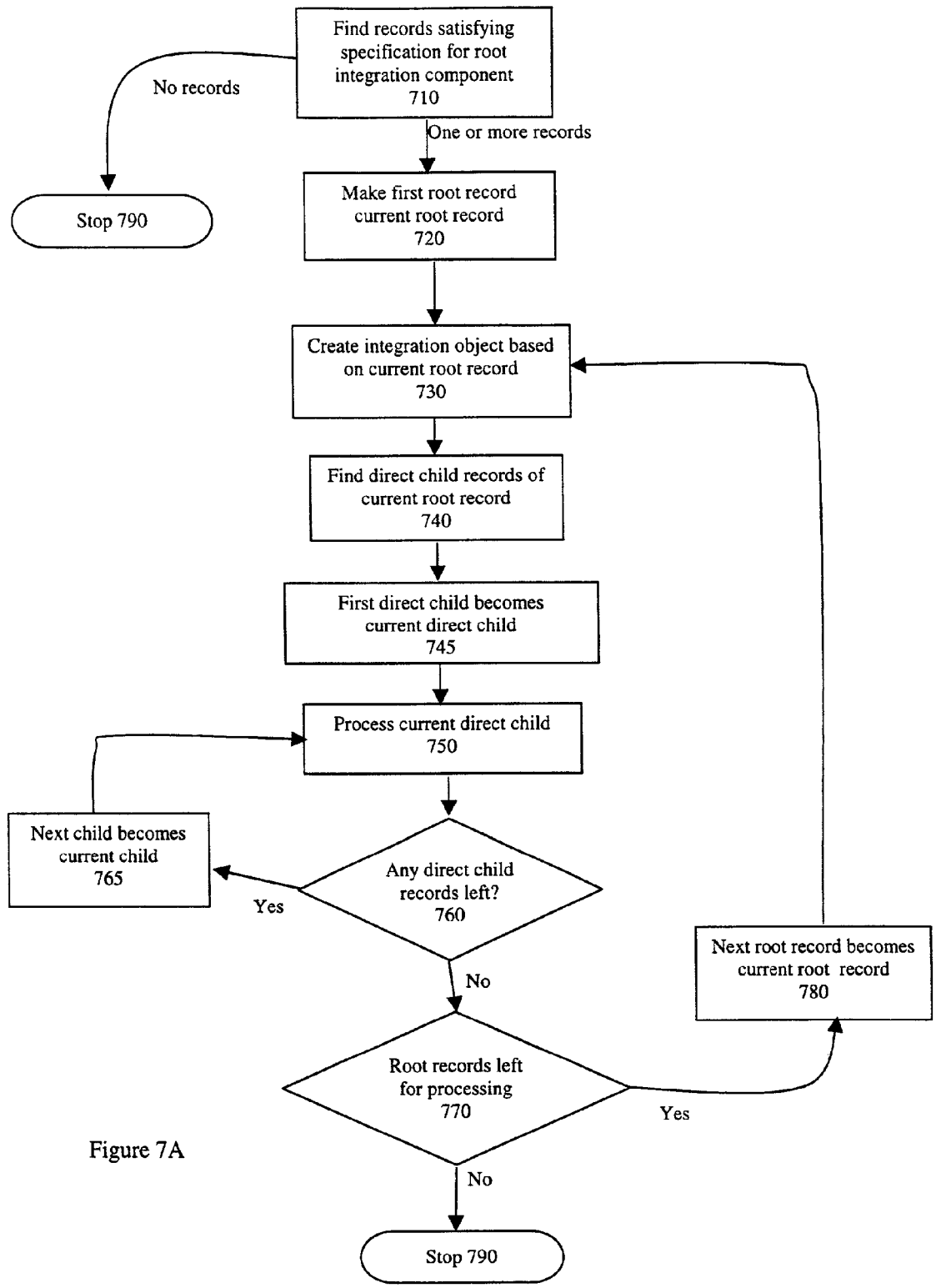
FIG. 7A provides a flow diagram of an embodiment of a method of generating integration objects from a relational database.
Figure 7B:
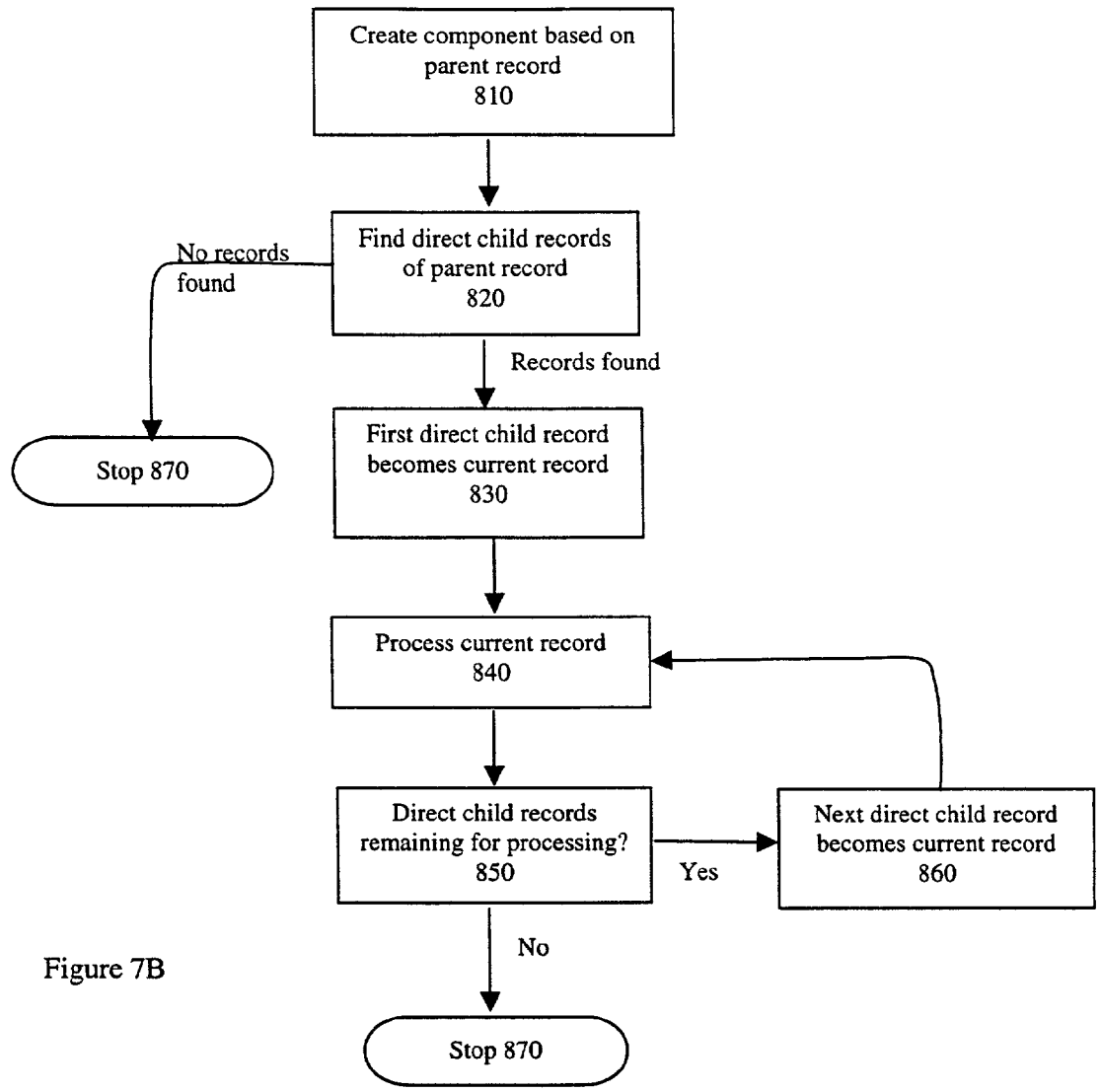
FIG. 7B provides a flow diagram of an embodiment of a method of generating child components in a integration object.

When data is to be extracted from the database and embodied in an integration object, one embodiment of the basic method is to first find the root entry and create an object for that. Next, the types of children available are found, and iteration on each child record of a given type is performed to create the child records, and then the next type of child record is processed. However, the children may be processed in a recursive manner, such that the children of a child record of a first type will be created prior to processing of a child record of a second type. FIGS. 7A and 7B illustrate an alternate embodiment of this method.

With respect to FIG. 7A, the overall process is illustrated. At block 710, records satisfying the specification for the root integration component are found. If no records are found, the process stops at block 790 and no integration object or component is created. If one or more records are found, at block 720, the first root record (record corresponding to the specification for the root integration component) is made the current root record. An integration object based on the current root record is created at block 730.

At block 740, direct children records of the current root record are found. If no such children records exist, at block 770 a determination is made as to whether root records are left for processing. If no root records remain for processing, at block 790 the process stops. If another root record remains for processing, at block 780 the next root record is made the current root record, and the process moves back to block 730. Note that the query for direct children records is made by the component level adapter, which goes through the object manager and data manager to find the direct children records in one embodiment. However, the metadata associated with the integration object may block the query for children, thus indicating that no direct children records are found due to the structure of the object and not due to the presence or absence of children records within the database.

If direct children records are found, then at block 745 the first child record is made the current child record. The child records are ordered based on the type of child record, such that all child records of a first type are processed before any child records of a second type are processed. At block 750, the current child record is recursively processed, which may include the process illustrated in FIG. 7B in one embodiment. Such processing may include creating a component of the integration object related to the child record and/or creating any necessary fields of a component of the integration object related to the child record or children of the child record.

At block 760, a determination is made as to whether any direct children have not yet been made the current direct child record. If the next direct children record has not yet been made the current direct child record, at block 765 becomes the current direct child record, and processing of that direct child record occurs at block 750. If all direct children records have been made the current direct child record and recursively processed, the process goes to block 770 to check whether root records still remain to be processed as described previously.

In one embodiment, processing of children records may be accomplished as illustrated in FIG. 7B. At block 810, a component is created based on a parent record, such as the child record to be processed at block 750 of FIG. 7A. Creating the component includes creating fields of the component, and filling in data. This may be accomplished by the component level adapter and the field level adapter working in tandem. Whether the data from the database becomes a component or field is dependent on the metadata definition of the integration object; the component and field level adapters match the data to the structure defined.

At block 820, direct child records of the parent record are found. If no direct child records are found, the process stops at block 870. If direct child records are found, at block 830 the first direct child record is made the current record. Note that the ordering of the child records is based on the type of child record, as was described previously with respect to FIG. 7A.

At block 840, the current record is processed, which, in one embodiment, primarily involves a recursive call to the same routine implementing FIG. 7B, with the current record regarded as the parent record at block 810. Thus, processing includes finding children of the current record and creating a component and/or fields related to the current record. Alternatively, the processing may involve creating the component and/or fields associated with the current child record and recursively finding and processing children of the current child record.

At block 850, a determination is made as to whether any direct child records have not been made the current child record. If so, the next direct child record is made the current child record at block 860 and the process goes to block 840 for processing of the current record. If there are no direct child records that have not yet been made the current child record and recursively processed, the process terminates at block 870.

Note that reference has been made to finding records within the database at various points in this description. Typically, records are found in the database using SQL queries to the database. For example, finding children of a current record may be accomplished through a SQL query specifying that all records having a parent id corresponding to the current record be retrieved from the relational database. The metadata associated with the integration object provides an indication as to which tables within the database should be queried based on both the definition of the object and the position of the corresponding component in the hierarchy. Furthermore, the inner and outer joins mentioned previously may be used as part of these queries.

Figure 8:
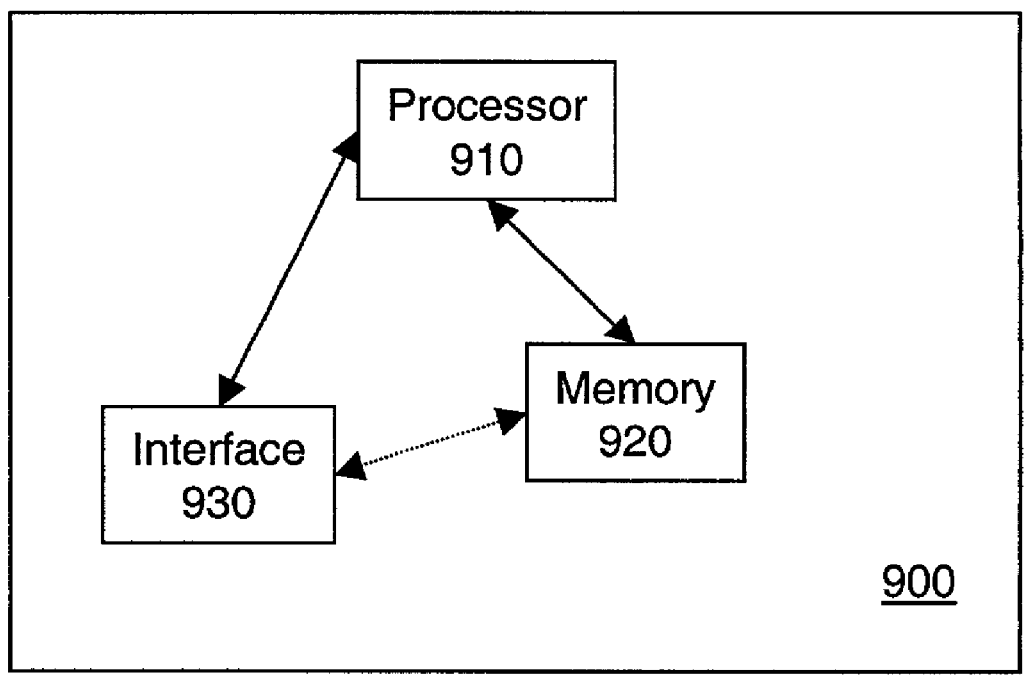
FIG. 8 illustrates an embodiment of a machine which may be used to implement one or more components of a system.

FIG. 8 illustrates an embodiment of a machine which may be used to implement one or more components of a system. The machine 900 includes a processor 910, a memory 920 coupled to the processor 910 and an interface 930 coupled to the processor 910. As will be appreciated, multiple processors 910, memories 920 and interfaces 930 may be included in a machine 900, and the processors 910, memories 920, and interfaces 930 may be implemented in a variety of ways, such that a processor 910 may be implemented as a general processor, or as some form of specialized processor. Moreover, it will be appreciated that a memory 920 may be expected to contain one or more of data or instructions suitable for use by the processor 910. Additionally, the processor 910, when executing instructions from the memory 920, may be expected to perform a method associated with those instructions. Memory 920 may be implemented as one or more of a variety of media such as those described later in this description.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program stored in the computer. Such a computer program may be stored in a computer readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIGS. 7A, 7B, or 8 may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc. . . . ) as taken in action or causing a result. Such expressions are merely a shorthand way of saying that execution of the software by a computer causes the processor of the computer to perform an action or produce a result.

In the foregoing, the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. The present specification and figures are accordingly to be regarded as illustrative rather than restrictive.

What is claimed is:

1. A method comprising:
   receiving input data comprising one or more integration object instances, wherein
      an integration object comprises a schema of a set of data, wherein the schema comprises a plurality of integration object components,
         the plurality of integration object components are hierarchically related,
         the plurality of integration object components comprises first and second integration object components, and
         the second integration object component is a child component of the first integration object component, and
      an integration object instance comprises data organized in a structure defined by the integration object, wherein
         the data is extracted from a first database,
         the data comprises a first and second integration object instance component each respectively corresponding to the first and the second integration object component; and
   modifying a database in response to the input data, the modifying comprising comparing a first database record with the first integration object component,
      modifying the first database record using the information associated with the first integration object instance component, if the first database record matches information associated with the first integration object component,
      finding one or more child database records associated with the first database record,
      modifying one or more of the child database records using the information associated with the second integration object instance component, if the second integration object component comprises a record matching a corresponding record in the one of the one or more child database records, and
      inserting a new database record comprising the information associated with the second integration object instance component, if the second integration object component does not comprise a record matching a corresponding record in one of the one or more child database records, wherein
         the one or more child database records comprises the new database record.

2. The method of claim 1, wherein the database modification process further comprises:
   deleting a record from the one or more child database records, if the record does not have a matching integration object component in the hierarchy.

3. The method of claim 1, wherein finding the first database record matching the first integration object component comprises:
   extracting a userkey related to an object type of the first integration object component;
   utilizing the userkey to find the first database record.

4. The method of claim 3 wherein:
   the finding comprises utilizing SQL queries directed to the database.

5. The method of claim 2 wherein:
   the deleting further comprises cascaded deleting.

6. A method comprising:
   receiving input data comprising one or more integration object instances, wherein
      an integration object comprises a schema of a set of data, wherein
         the schema comprises a plurality of integration object components,
         the plurality of integration object components are hierarchically related,
         the plurality of integration object components comprises first and second integration object components, and
         the second integration object component is a child component of the first integration object component, and
      an integration object instance comprises data organized in a structure defined by the integration object, wherein the data is extracted from a first database,
         the data comprises a first and second integration object instance component each respectively corresponding to the first and the second integration object component; and
   modifying the plurality of integration object instances using a database, said modifying comprising
      comparing a first database record with the first integration object component,
      modifying the first integration object instance component using data from the first database record, if the first database record matches information associated with the first integration object component,
      finding one or more child database records associated with the first database record,
      modifying the second integration object instance component using data from one of the one or more child database records, if the second integration object component comprises a record matching a corresponding record in the one of the one or more child database records, and
      inserting a new integration object component instance comprising data from one of the one or more child database records, if the one of the one or more child database records does not comprise a record matching a corresponding record in the second integration object component, wherein
         the new integration object component instance is a child of the first integration object component instance.

7. The method of claim 6 wherein the finding the first database record matching the first integration object component comprises:
   extracting a userkey related to an object type of the first integration object component; and
   utilizing the userkey to find the first database record.

8. An apparatus comprising:
means for receiving input data comprising one or more integration object instances, wherein
an integration object comprises a schema of a set of data, wherein
the schema comprises a plurality of integration object components,
the plurality of integration object components are hierarchically related,
the plurality of integration object components comprises first and second integration object components, and
the second integration object component is a child component of the first integration object component, and
an integration object instance comprises data organized in a structure defined by the integration object, wherein the data is extracted from a first database,
the data comprises a first and second integration object instance component each respectively corresponding to the first and the second integration object component; and
means for modifying the plurality of integration object instances using a database, the means for modifying comprising
means for comparing a first database record with the first integration object component,
means for modifying the first integration object instance component using data from the first database record, if the first database record matches information associated with the first integration object component,
means for finding one or more child database records associated with the first database record,
means for modifying the second integration object instance component using data from one of the one or more child database records, if the second integration object component comprises a record matching a corresponding record in the one of the one or more child database records, and
means for inserting a new integration object component instance comprising data from one of the one or more child database records, if the one of the one or more child database records does not comprise a record matching a corresponding record in the second integration object component, wherein
the new integration object component instance is a child of the first integration object component instance.

9. The apparatus of claim 8 wherein the means for finding the first database record matching the first integration object component comprises:
means for extracting a userkey related to an object type of the first integration object component; and
means for utilizing the userkey to find the first database record.

10. A machine-readable medium embodying instructions, the instructions, when executed by a processor, causing the processor to perform a method, the method comprising:
receiving input data comprising one or more integration object instances, wherein
an integration object comprises a schema of a set of data, wherein
the schema comprises a plurality of integration object components,
the plurality of integration object components are hierarchically related,
the plurality of integration object components comprises first and second integration object components, and
the second integration object component is a child component of the first integration object component, and
an integration object instance comprises data organized in a structure defined by the integration object, wherein the data is extracted from a first database,
the data comprises a first and second integration object instance component each respectively corresponding to the first and the second integration object component; and
modifying a database in response to the input data, the modifying comprising
comparing a first database record with the first integration object component,
modifying the first database record using the information associated with the first integration object instance component, if the first database record matches information associated with the first integration object component,
finding one or more child database records associated with the first database record,
modifying one or more of the child database records using the information associated with the second integration object instance component, if the second integration object component comprises a record matching a corresponding record in the one of the one or more child database records, and
inserting a new database record comprising the information associated with the second integration object instance component, if the second integration object component does not comprise a record matching a corresponding record in one of the one or more child database records, wherein
the one or more child database records comprises the new database record.

11. The machine readable medium of claim 10, further embodying instructions, which, when executed by the processor, cause the processor to perform the method, wherein the database modification process further comprises:
deleting a record from the one or more child database records, if the record does not have a matching integration object component in the hierarchy.

12. The machine readable medium of claim 10, further embodying instructions, which, when executed by the processor, cause the processor to perform the method wherein finding the first database record matching the first integration object component comprises:
extracting a userkey related to an object type of the first integration object component;
utilizing the userkey to find the first database record.

13. The machine readable medium of claim 12, further embodying instructions, which, when executed by the processor, cause the processor to perform the method wherein:
the finding includes utilizing SQL queries directed to the database.

14. The machine readable medium of claim 13, further embodying instructions, which, when executed by the processor, cause the processor to perform the method wherein:
the deleting further includes cascaded deleting.

15. A system comprising:
a memory;
an interface, coupled to the memory, configured to receive input data comprising one or more integration object instances, wherein an integration object comprises a schema of a set of data, wherein
   the schema comprises a plurality of integration object components,
   the plurality of integration object components are hierarchically related,
   the plurality of integration object components comprises first and second integration object components, and
   the second integration object component is a child component of the first integration object component, and
an integration object instance comprises data organized in a structure defined by the integration object, wherein the data is extracted from a first database,
   the data comprises a first and second integration object instance component each respectively corresponding to the first and the second integration object component; and
a processor, coupled to the interface, configured to modify a database in response to the input data, wherein to modify the database the processor is further configured to
   compare a first database record matching with the first integration object component,
   modify the first database record using the information associated with the first integration object instance component, if the first database record matches information associated with the first integration object component,
   find one or more child database records associated with the first database record,
   modify one or more of the child database records using the information associated with the second integration object instance component, if the second integration object component comprises a record matching a corresponding record in the one of the one or more child database records, and
   insert a new database record comprising the information associated with the second integration object instance component, if the second integration object component does not comprise a record matching a corresponding record in one of the one or more child database records, wherein
   the one or more child database records comprises the new database record.

16. The system of claim 15 wherein to modify the database, the processor is further configured to
   delete a record from the one or more child database records, if the record does not have a matching integration object component in the hierarchy.

17. The system of claim 16 wherein to delete the record, the processor is further configured to:
   cascade delete.

18. The system of claim 15 wherein to find the first database record matching the first integration object component, the processor is further configured to
   extract a userkey related to an object type of the first integration object component, and
   utilize the userkey to find the first database record.

19. The system of claim 18 wherein to find the database records, the processor is further configured to:
   utilize SQL queries directed to the database.

\* \* \* \* \*